United States Patent
Weinhardt et al.

(10) Patent No.: US 11,300,175 B2
(45) Date of Patent: Apr. 12, 2022

(54) METHOD FOR OPERATING A DRIVETRAIN OF A MOTOR VEHICLE AND DRIVETRAIN FOR A MOTOR VEHICLE

(71) Applicant: AUDI AG, Ingolstadt (DE)

(72) Inventors: Mathias Weinhardt, Ingolstadt (DE); Markus Göbel, Nassenfels (DE)

(73) Assignee: AUDI AG, Ingolstadt (DE)

( * ) Notice: Subject to any disclaimer, the term of this patent is extended or adjusted under 35 U.S.C. 154(b) by 267 days.

(21) Appl. No.: 16/644,638

(22) PCT Filed: Sep. 5, 2018

(86) PCT No.: PCT/EP2018/073856
§ 371 (c)(1),
(2) Date: Mar. 5, 2020

(87) PCT Pub. No.: WO2019/057495
PCT Pub. Date: Mar. 28, 2019

(65) Prior Publication Data
US 2021/0062889 A1 Mar. 4, 2021

(30) Foreign Application Priority Data

Sep. 25, 2017 (DE) .......................... 102017216976.1

(51) Int. Cl.
*F16F 15/00* (2006.01)
*F02D 41/02* (2006.01)
(Continued)

(52) U.S. Cl.
CPC ........ *F16F 15/002* (2013.01); *F02D 41/0215* (2013.01); *F16F 15/145* (2013.01);
(Continued)

(58) Field of Classification Search
CPC ...... F16F 15/002; F16F 15/145; F16F 15/167; F16F 15/162; F16F 2222/08;
(Continued)

(56) References Cited

U.S. PATENT DOCUMENTS

| 2005/0090370 A1* | 4/2005 | Berger | B60K 6/48 903/917 |
| 2010/0048353 A1* | 2/2010 | Iwase | F02N 5/04 475/5 |

(Continued)

FOREIGN PATENT DOCUMENTS

| DE | 10316442 A1 | 10/2003 |
| DE | 10316422 A1 | 12/2003 |

(Continued)

OTHER PUBLICATIONS

Office Action dated Aug. 4, 2021 in corresponding Chinese Application No. 201880059044.8; 20 pages including English-language translation.

(Continued)

*Primary Examiner* — George C Jin
(74) *Attorney, Agent, or Firm* — Maier & Maier, PLLC

(57) ABSTRACT

A method for operating a drivetrain of a motor vehicle having at least one centrifugal pendulum, in which the centrifugal pendulum comprises at least one primary part rotatable about an axis of rotation, at least one secondary part movable relative to the primary part, and at least one damping medium by which relative movements are hydraulically dampened between the primary part and the secondary part, wherein at least one temperature of the damping medium is calculated by an electronic calculating device of the drivetrain with the aid of a mathematical model.

17 Claims, 1 Drawing Sheet

(51) Int. Cl.
*F16F 15/14* (2006.01)
*F16F 15/167* (2006.01)
*F16F 15/16* (2006.01)

(52) U.S. Cl.
CPC ...... *F16F 15/167* (2013.01); *F02D 2200/021* (2013.01); *F02D 2200/101* (2013.01); *F16F 15/162* (2013.01); *F16F 2222/08* (2013.01); *F16F 2228/002* (2013.01); *F16F 2228/066* (2013.01); *F16F 2230/18* (2013.01); *F16F 2232/02* (2013.01); *F16F 2236/08* (2013.01)

(58) Field of Classification Search
CPC ........... F16F 2228/002; F16F 2228/066; F16F 2232/02; F16F 2236/08; F02D 41/0215; F02D 2200/021; F02D 2200/101
See application file for complete search history.

(56) References Cited

U.S. PATENT DOCUMENTS

| | | | |
|---|---|---|---|
| 2016/0159188 A1* | 6/2016 | Mohamed | F16F 15/002 701/37 |
| 2017/0370301 A1* | 12/2017 | Srinivasan | F02D 17/02 |
| 2018/0149230 A1* | 5/2018 | Kono | F16F 15/005 |

FOREIGN PATENT DOCUMENTS

| | | |
|---|---|---|
| DE | 102005020961 A1 | 11/2006 |
| DE | 102005031813 A1 | 1/2007 |
| DE | 102008054165 B3 | 1/2010 |
| DE | 102009024563 A1 | 8/2010 |
| DE | 102011086014 A1 | 5/2013 |
| DE | 10191355 B4 | 7/2014 |
| DE | 102014213601 A1 | 1/2016 |
| DE | 102015211697 A1 | 12/2016 |
| GB | 2501286 A | 10/2013 |

OTHER PUBLICATIONS

English-language translation of International Preliminary Report on Patentability dated Mar. 31, 2020, in corresponding International Application No. PCT/EP2018/073856; 6 pages.

German Examination Report dated May 4, 2018 in corresponding German Application No. 102017216976.1; 10 pages; Machine translation attached.

German Examination Report dated Nov. 19, 2019 in corresponding German Application No. 102017216976.1; 20 pages; Machine translation attached.

International Search Report dated Jan. 4, 2019 and Written Opinion in corresponding International Application No. PCT/EP2018/073856; 16 pages; Machine translation attached.

Chinese Office Action dated Dec. 31, 2020, in corresponding CN Application No. 201880059044.8 (20 pp., including machine-generated English translation).

* cited by examiner

METHOD FOR OPERATING A DRIVETRAIN OF A MOTOR VEHICLE AND DRIVETRAIN FOR A MOTOR VEHICLE

FIELD

The disclosure relates to a method for operating a drivetrain of a motor vehicle, as well as a drivetrain for a motor vehicle.

BACKGROUND

Such a method for operating a drivetrain of a motor vehicle as well as such a drivetrain for a motor vehicle are already known, for example, from DE 10 2009 024 563 A1. The drivetrain comprises at least one centrifugal pendulum, having at least one primary part rotatable about an axis of rotation, at least one secondary part movable, especially rotatable, relative to the primary part, and at least one damping medium by means of which relative movements, especially relative rotations, are hydraulically dampened or are to be dampened between the primary part and the secondary part. The secondary part and the primary part are movable, especially rotatable, relative to each other, especially about the axis of rotation, especially within certain bounds and especially between two end positions, but not beyond the end positions, these relative movements or rotations between the primary part and the secondary part being dampened by means of the damping medium, for example being rotational or torsional vibrations of at least one component of the drivetrain, designed for example as a shaft.

Furthermore, DE 10 2014 213 601 A1 discloses a method for actuating an electric motor in a drivetrain of a motor vehicle.

Moreover, there is known from DE 10 2015 211 697 A1 a centrifugal pendulum device, comprising an axis of rotation, a pendulum mass carrier able to turn about the axis of rotation, and pendulum masses arranged on the pendulum mass carrier and able to move along pendulum tracks between two end positions.

SUMMARY

The problem which the present disclosure proposes to solve is to modify a method and a drivetrain of the aforementioned kind so that an especially quiet and efficient operation of the drivetrain can be realized.

This problem is solved by a method having the features of the disclosure and by a drivetrain having the features of the disclosure.

A first aspect of the disclosure involves a method for operating a drivetrain of a motor vehicle, especially an automobile and for example a passenger car. The drivetrain has at least one centrifugal pendulum, which comprises at least one primary part rotatable about an axis of rotation, at least one secondary part movable, especially rotatable, relative to the primary part, and at least one damping medium. By means of the damping medium, relative movements, especially relative rotations, are to be hydraulically dampened between the primary part and the secondary part, or in the context of the method relative movements, especially relative rotations, are hydraulically dampened between the primary part and the secondary part.

Thanks to the relative movements between the primary part and the secondary part and by means of the damping medium, it is possible to dampen for example rotary vibrations of at least one component of the drivetrain, the rotary vibrations being also known as torsional vibrations. The component is, for example, a shaft, which can turn for example about the aforesaid axis of rotation. In particular, it is conceivable for the primary part to be coupled indirectly, especially directly, to the shaft, and thereby can be coupled to the shaft and be driven by the shaft and thus can be turned or is turned about the axis of rotation, especially relative to a casing of the drivetrain. Thus, torsional vibrations of the component can be kept low by means of the centrifugal pendulum, used as a torsional vibration damper, so that an especially quiet running can be produced.

Now, in order to realize an especially quiet as well as efficient and thus low fuel-consuming operation of the drivetrain, it is provided according to the invention that at least one temperature of the damping medium is calculated by means of an electronic calculating device of the drivetrain with the aid of a mathematical model, which is stored for example in a storage device of the calculating device.

The invention is based in particular on the following understanding: in the centrifugal pendulum, the damping medium is used in order to dampen radial vibrations of the primary part and the secondary part, that is, relative movements between the primary part and the secondary part. The secondary part, for example, is rotationally fixed to another component of the drivetrain and/or is received in a space bounded for example at least partly, especially at least predominantly or entirely by the primary part, in which the damping medium is contained. In particular, multiple secondary parts may be provided, the secondary parts are designed or function for example as pendulum masses. The particular pendulum mass is also simply known as a pendulum. For example, the primary part is a pendulum mass carrier, on which the respective pendulum mass can be held. In particular, the secondary part, especially the pendulum mass, is movable relative to the primary part within certain bounds and in particular between two end positions, but not beyond the end positions, in particular it can turn about the axis of rotation, such displacements of the secondary part occurring relative to the primary part, especially those of the pendulum mass, being hydraulically dampened by means of the damping medium. For this, the damping medium flows for example during relative rotations between the primary part and the secondary part through at least one gap from a first chamber to a second chamber, thereby dampening the relative movements.

Thus, relative movements, especially relative rotations, between the primary part and the secondary part can be dampened by means of the damping medium. Such relative movements between the primary part and the secondary part occur, for example, as a result of load impulses or resonances, especially while the secondary part is turning about the axis of rotation.

The damping medium thus has a dampening effect, by means of which the relative movements between the primary part and the secondary part, especially radial vibrations between the primary part and the secondary part, are dampened. At low temperatures, the dampening effect of the damping medium is reduced as compared to higher temperatures, so that for example the secondary part upon reaching the respective end position can come up against abutments, that is, bear against respective abutments. The abutments, for example, limit the relative movements between the primary part and the secondary part.

In other words, the secondary part can strike against the abutments, and thereby unwanted noises may be produced, which can be perceived acoustically by passengers of the motor vehicle. In order to avoid such knocking even at low temperatures, boundary conditions with respect to the operation of the drivetrain can be varied, especially in dependence on the temperature of the damping medium. However, a changing of the boundary conditions may cause impairments and disadvantages in other areas, such as driving behavior or fuel consumption. Hence, it is desirable on the one hand to avoid such restrictions and disadvantages or at least to curtail them as much as possible, but on the other hand to avoid the noises caused by the centrifugal pendulum. For this, it is desirable to know the temperature of the damping medium with sufficient precision in order to adapt the operation of the drivetrain precisely, especially to the current temperature of the damping medium.

Moreover, there are problems in that the centrifugal pendulum is usually a rotating system, which turns during the operation of the drivetrain. This is usually the case because the primary part with the aforementioned component is rotationally fixed, and the secondary part for example turns along with the primary part. In such a rotating system, a measurement or detection of the temperature of the damping medium by means of a temperature sensor can only be done in very costly manner, if at all, and is thus cost intensive.

Since it is provided in the method according to the invention to calculate the temperature of the damping medium, and not to detect it, or not detect it only by means of a temperature sensor, the temperature of the damping medium can be ascertained in a precise as well as simple and cost effective manner. For this, the damping medium, and especially its temperature, is simulated by the mentioned mathematical model, especially in at least a physical and/or chemical manner, wherein the mathematical model is stored for example in the electronic calculating device. Hence, it is preferably provided that there is no detection or measurement of the temperature of the damping medium effectuated by a temperature sensor in the context of the invention.

In order to allow an especially advantageous and especially quiet operation, it is provided in an advantageous embodiment of the invention that at least one component of the drivetrain is operated in dependence on the calculated temperature. In this way, it is possible to adapt the operation of the drivetrain to the temperature, so that the excessive production of undesirable noises can be avoided, in particular also at low temperatures. It is conceivable, for example, to operate the drivetrain at least temporarily in an operating state in which the aforementioned knocking does not occur even at low temperatures, especially of the damping medium. Since the temperature of the damping medium can be calculated especially precisely in the context of the method according to the invention, the operating state can be kept especially short, so that an excessive energy consumption, especially a fuel consumption, can be avoided.

A further embodiment is characterized in that the drivetrain comprises at least one drive motor designed to drive the motor vehicle, by means of which at least the primary part is driven and thereby rotated about the axis of rotation. The drive motor for example is an internal combustion engine, by means of which the motor vehicle can be driven. In particular, the drive motor comprises an output shaft, formed for example as a crankshaft, by which at least the primary part or the centrifugal pendulum as a whole can be driven and thereby is turned or can be turned about the axis of rotation, especially relative to a casing of the drive motor. By means of the centrifugal pendulum, torsional or rotary vibrations of the output shaft are dampened, so that an especially quiet and thus comfortable running of the drive motor can be produced. In this way, an especially comfortable operation can be assured.

It has proven to be especially advantageous when the drive motor is used as the component which is operated in dependence on the calculated temperature. In this way, an especially low-noise and thus comfortable operation can be produced in an especially energy-efficient manner.

In order to securely prevent excessive noise even at low temperatures, especially for the damping medium, it is provided in a further embodiment of the invention that a load of the drive motor and/or a rotational speed with which an output shaft of the drive motor is turning is adjusted in dependence on the ascertained temperature.

In order to calculate the temperature of the damping medium especially precisely, it is provided in a further embodiment of the invention that the temperature of the damping means is calculated with the aid of the mathematical model in dependence on a rotational speed and/or a load of the drive motor.

In an especially advantageous embodiment of the invention, the temperature is calculated with the aid of the mathematical model in dependence on a temperature of a coolant for cooling the drive motor, especially a cooling fluid. By means of the coolant, a heat input to the damping medium can occur, whereby the damping medium is heated by means of the coolant. Moreover, it is conceivable for a heat output from the damping medium to be achieved by means of the coolant, whereby the damping medium is cooled. In particular, the damping medium is cooled or heated by means of the coolant, according to the operating state of the internal combustion engine. By taking into account coolant when calculating the temperature of the damping medium, the temperature of the latter can be calculated especially precisely.

In another embodiment of the invention, the temperature of the damping medium is calculated in dependence on a fluid for operating a transmission of the drivetrain, especially a liquid. The fluid for operating the transmission is also known as ATF (automatic transmission fluid) and it is used, for example, to hydraulically shift the shifting elements of the transmission. By means of the transmission, for example, torques which are produced by the drive motor across its output shaft can be converted into different torques with respect to it. Similar to the remarks on the coolant, the fluid for operating the transmission can be used to bring about a heat input and/or a heat output in or from the damping medium, especially according to the operating state of the transmission or the drive motor. Since it is now preferably provided to also take account of the fluid or its temperature when calculating the temperature of the damping medium, the temperature of the damping medium can be calculated precisely and in this way it can be easily determined.

Finally, it has proven to be especially advantageous when a grease is used as the damping medium. Basically, it is conceivable to use an oil as the damping medium. However, in order to realize an especially low-noise operation, it has proven to be advantageous to use a grease as the damping medium. In the context of the invention, the difference between grease and oil is that grease is solid at room temperature, that is, at 22 degrees Celsius, while oil is liquid at room temperature or at 22 degrees Celsius. Hence, grease has especially high viscosity, whereby the relative movements between the primary part and the secondary part or radial vibrations of the centrifugal pendulum and thus rotary vibrations can thus be especially well dampened.

A second aspect of the invention involves a drivetrain for a motor vehicle, especially for an automobile such as a passenger car. The drivetrain according to the invention has at least one centrifugal pendulum, which comprises at least one primary part rotatable about an axis of rotation, at least one secondary part movable relative to the primary part, and at least one damping medium by means of which relative movements are to be hydraulically dampened, or are dampened, between the primary part and the secondary part. As explained for the method according to the invention, the relative movements between the primary part and the secondary part may result in a turning of the primary part about the axis of rotation. In particular, the relative movements between the primary part and the secondary part are relative rotations between the primary part and the secondary part, these relative rotations occurring for example about the axis of rotation.

Now, in order to realize an especially quiet and efficient operation of the drivetrain, it is provided in the second aspect of the invention that the drivetrain comprises an electronic calculating device, which is adapted to calculate at least one temperature of the damping medium with the aid of a mathematical model. In other words, the drivetrain according to the second aspect of the invention is adapted to carry out a method according to the first aspect of the invention. Advantages and advantageous embodiments of the first aspect of the invention are to be seen as being advantages and advantageous embodiments of the second aspect of the invention and vice versa.

Further advantages, features and details of the invention will emerge from the following description of a preferred exemplary embodiment and with the aid of the drawing. The features and combinations of features mentioned above in the specification, as well as the features and combinations of features mentioned below in the description of the figures and/or shown alone in the drawings, may be used not only in the particular indicated combination, but also in other combinations or standing alone, without leaving the scope of the invention.

DETAILED DESCRIPTION

In the figures, the same or functionally equal elements are given the same reference numbers.

Figure 1:
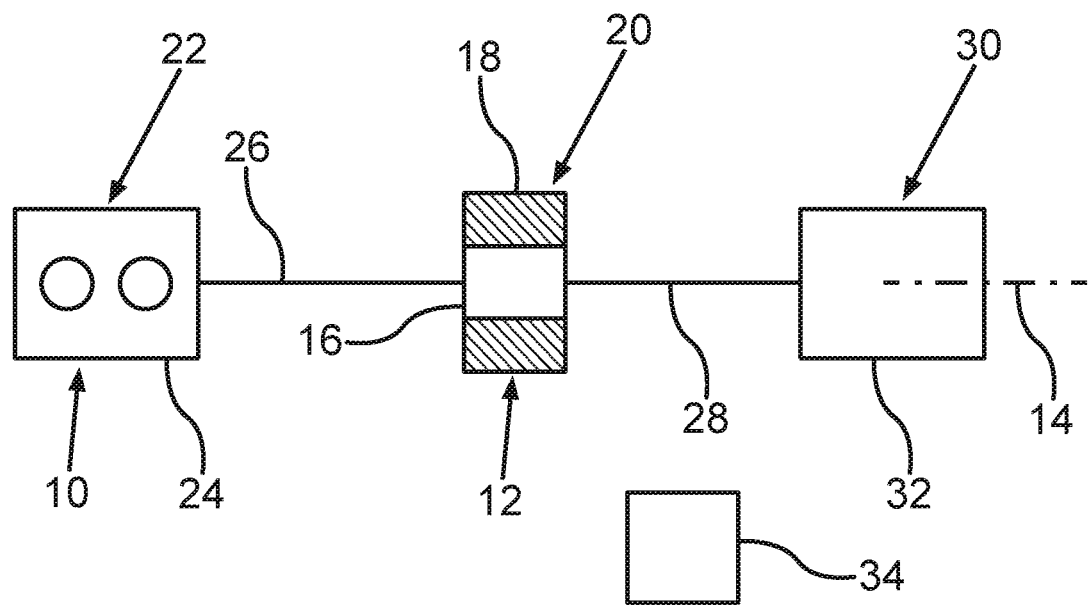
FIG. 1 a schematic representation of a drivetrain according to the invention for a motor vehicle.

FIG. 1 shows in a schematic representation a drivetrain 10 for a motor vehicle, especially for an automobile such as a passenger car. The drivetrain 10 comprises at least one centrifugal pendulum 12, which has at least one primary part 16 rotatable about an axis of rotation 14 and at least one secondary part 18 movable relative to the primary part 16. Moreover, the centrifugal pendulum 12 has at least one damping medium 20, represented especially schematically in FIG. 1, by means of which relative movements between the primary part 16 and the secondary part 18 are to be hydraulically dampened or are dampened, especially during an operation of the drivetrain 10.

The drivetrain 10 further comprises a drive motor 22, which is configured for example as an internal combustion engine, especially as a reciprocating combustion engine. The drive motor 22 comprises at least one engine casing 24, which is a casing of the drivetrain 10. Furthermore, the drive motor 22 comprises an output shaft 26, configured for example as a crankshaft, which is mounted rotatably on the engine casing 24 and can thereby rotate about the axis of rotation 14 relative to the engine casing 24. In particular, the output shaft 26 rotates about the axis of rotation 14 relative to the engine casing 24 during the aforementioned operation of the drivetrain 10, wherein the drive motor 22 provides at least one torque across the output shaft 26 for the driving of the motor vehicle. The primary part 16 is connected or coupled at least indirectly, especially directly, to the output shaft 26, so that the primary part 16 is driven across the output shaft 26 by the drive motor 22 and in this way is rotated about the axis of rotation 14, especially relative to the engine casing 24.

In the context of the at least indirect, especially the direct coupling of the primary part 16 to the output shaft 26, it may be provided that the primary part 16 is rotationally fixed at least indirectly, especially directly, to the output shaft 26. It is conceivable for the centrifugal pendulum 12 to comprise the secondary part 18 as a single secondary part and thus precisely one secondary part in the form of the secondary part 18.

The output shaft 26 is for example a first component of the drivetrain 10. Alternatively or additionally, it is conceivable for the secondary part 18 to be rotationally fixed to a further component, for example in the form of another shaft 28 of the drivetrain 10. Moreover, it is conceivable for the centrifugal pendulum 12 to have multiple secondary parts 18, that is, a plurality of secondary parts. The respective secondary part 18 is for example a pendulum mass, also simply known as a pendulum. Hence, it is conceivable for the centrifugal pendulum 12 to have a plurality of pendulum masses. The secondary part 18 is received for example in a space which is bounded by or formed at least partly, especially at least predominantly or entirely by the primary part 16. For example, the damping medium 20 is also received in the space. Moreover, it is conceivable for the primary part 16 to be rotationally fixed to the further component in the form of the further shaft 28. On the whole, it can be seen for example that the shaft 28 is driven or can be driven across the centrifugal pendulum 12 by the output shaft 26 and thus by the drive motor 22. The shaft 28, for example, is a transmission input shaft of a transmission 30 of the drivetrain 10 or is rotationally fixed at least indirectly, especially directly, to the transmission input shaft. Hence, for example, the torque provided by the drive motor 22 across the output shaft 26 can be transferred across the centrifugal pendulum 12 to the shaft 28 and be channeled across the shaft 28 to the transmission 30.

The transmission 30 is for example an automatic transmission and it may be designed in particular as a converter automatic transmission. Alternatively or additionally, the transmission 30 is designed as a hydraulically operated transmission, so that the transmission 30 can be operated, in particular activated, by means of a fluid, especially one formed as a liquid, also known as transmission fluid. In particular, the transmission fluid is used in order to activate or shift at least one or more shifting elements of the transmission 30 and in particular to move them relative to a transmission casing 32 of the transmission 30.

Now, if a relative movement occurs for example between the primary part 16 and the secondary part 18, where this relative movement may be a relative rotation between the primary part 16 and the secondary part 18 occurring in particular about the axis of rotation 14, at least a portion of the damping medium 20 will flow through at least one gap from a first chamber to a second chamber, for example, the chambers being for example components of the respective receiving space. Thanks to this flow of the damping medium 20, the relative movement between the primary part 16 and the secondary part 18 is dampened, for example. In this way, radial vibrations of the at least one secondary part 18 can be dampened. On the whole, it is conceivable that rotary or torsional vibrations of the output shaft 26 will be dampened by means of the centrifugal pendulum 12. The damping medium 20 will have a dampening function, by means of which the primary part 16 and the secondary part 18 or their relative movements with respect to each other are dampened.

The primary part 16 and the secondary part 18 can move, in particular rotate, relative to each other in particular between two end positions, but not beyond the end positions. The end positions are defined or formed for example by respective end stops.

Now, if the damping medium 20 has an especially low temperature, resulting for example from low outdoor temperatures or ambient temperatures, as compared to higher temperatures, it may happen that the secondary part 18 during the course of the relative movements between the primary part 16 and the secondary part 18 will knock hard against the respective end stop, unless appropriate countermeasures are taken. Unwanted noise may result from this hard knocking, which can be acoustically perceived by passengers of the motor vehicle.

Now, in order to avoid the occurrence of such noises and thus realize an especially low-noise and at the same time an especially efficient operation of the drivetrain 10, the drivetrain 10 comprises an electronic calculating device 34, shown especially schematically in FIG. 1, which is adapted to calculate with the aid of a mathematical model at least one temperature of the damping medium 20. In other words, a method is provided for operating the drivetrain 10, wherein the electronic calculating device 34 of the drivetrain 10 is used to calculate at least one temperature of the damping medium 20 with the aid of the mathematical model. It is preferably provided that there is no detection or measurement of the temperature of the damping medium 20 by a temperature sensor. This embodiment is based on the fact that the centrifugal pendulum 12 is a rotary system, because at least the primary part 16 or the centrifugal pendulum 12 as a whole is driven by the output shaft 26 and thereby turned about the axis of rotation 14, for which the detection of the temperature by means of a temperature sensor is very costly, if not impossible, and this is preferably avoided.

In particular, it is possible with the method to operate at least one component and at least the drive motor 22 for example in dependence on the calculated temperature, especially to control or regulate it. This is done preferably by means of the electronic calculating device 34.

Figure 2:
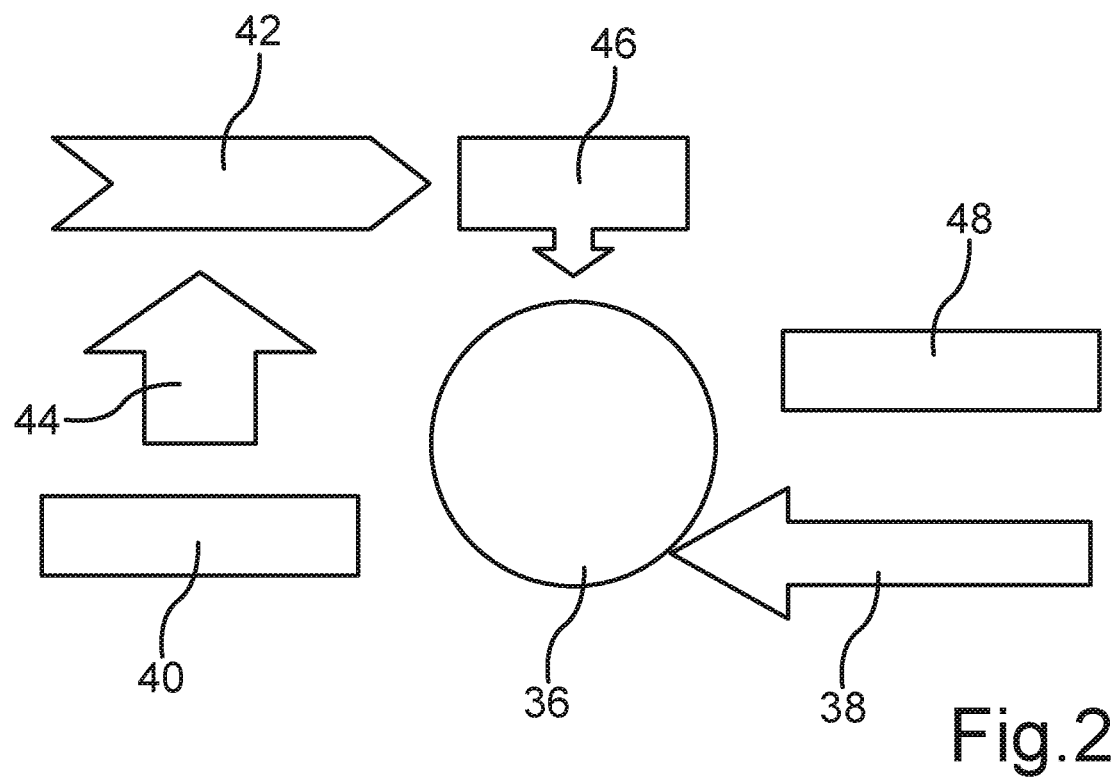
FIG. 2 a flow chart to illustrate a method according to the invention for the operation of the drivetrain.

FIG. 2 shows a flow chart explaining the method more closely. The method involves, for example, a block 36, which comprises the mathematical model for example. In the block 36, the temperature is calculated. For example, the centrifugal pendulum 12 is a dual mass flywheel (ZMS), so that the temperature is a ZMS temperature, for example.

For example, it is illustrated by an arrow 38 that the temperature of the damping medium 20 is calculated with the aid of the mathematical model in dependence on a rotational speed and/or a load of the drive motor 22. In other words, a heat and/or temperature input in the damping medium 20 is calculated in terms of motor rotational speed and load or engine torque, for example. It is illustrated by a double arrow 40 that the temperature of the damping medium 20 is calculated with the aid of the mathematical model in dependence on a temperature of a coolant for cooling the drive motor 22, especially one in the form of a liquid. In other words, a heat or temperature input and/or a temperature or heat output occurs through the coolant, also known as the motor coolant. The temperature of the damping medium 20 is calculated in dependence on the temperature input in terms of the motor rotational speed and the engine torque as well as the input or output through the coolant. It is illustrated by the double arrow 40 that the damping medium 20 can be heated or also cooled by means of the coolant, depending on the operating state of the drivetrain 10, which is taken into consideration by the method.

It is illustrated by an arrow 42 that the temperature of the damping medium 20 is calculated in dependence on revolutions of the drive motor 22, especially the output shaft 26, and in dependence on a current model temperature. For example, a weighting is done in terms of the engine torque, as illustrated in FIG. 2 by an arrow 44. The heat or temperature input in terms of motor revolutions and current model temperature is filtered by means of a filter 46 and then taken to the block 36. In particular, consideration is given to the fact that the thicker the damping medium 20, the higher the heat input.

As the starting value for the temperature of the damping medium 20 there is used for example a temperature of the transmission fluid during activated ignition of the motor vehicle. It is illustrated by a double arrow 48 that the temperature of the damping medium 20 is calculated with the aid of the mathematical model in dependence on the transmission fluid for the operation of the transmission 30. Depending on the operating state of the drivetrain 10, the damping medium 20 can be cooled or heated by means of the transmission fluid, so that depending on the operating state of the drivetrain 10 a heat or temperature input in the damping medium 20 or a temperature or heat output from the damping medium 20 is accomplished by means of the transmission fluid.

On the whole, it will be seen that the temperature of the damping medium 20 is calculated for example in dependence on the load of the drive motor 22, of the rotational speed with which the output shaft 26 is turning, and in dependence on the transmission 30, especially in dependence on the transmission fluid or in dependence on the temperature of the transmission fluid.

Preferably, a grease is used as the damping medium 20, with which the radial vibrations can be dampened especially advantageously. Moreover, it is preferably provided that the load and/or the rotational speed of the drive motor 22 is adjusted in particular in dependence on the calculated temperature. In this way, for example, it is possible to adjust a higher rotational speed at low temperatures of the damping medium than at higher temperatures, in order to thereby prevent the aforementioned knocking. However, operating states with such an elevated motor rotational speed can now be kept especially short, because the temperature of the damping medium is calculated especially precisely, so that an excessive energy consumption, especially a fuel consumption, can be avoided. Consequently, an especially low-noise and efficient operation can be produced.

The invention claimed is:

1. A method for operating a drivetrain of a motor vehicle comprising:
at least one centrifugal pendulum, in which the centrifugal pendulum comprises at least one primary part rotatable about an axis of rotation, at least one secondary part movable relative to the primary part, and at least one damping medium by which relative movements are hydraulically dampened between the primary part and the secondary part, wherein at least one temperature of the damping medium is calculated by an electronic calculating device of the drivetrain with the aid of a mathematical model.

2. The method according to claim 1, wherein at least one component of the drivetrain is operated in dependence on the calculated temperature.

3. The method according to claim 1, wherein the drivetrain comprises at least one drive motor designed to drive the motor vehicle, by which at least the primary part is driven and thereby rotated about the axis of rotation.

4. The method according to claim 2, wherein the drive motor is used as the component.

5. The method according to claim 4, wherein a load of the drive motor and/or a rotational speed with which an output shaft of the drive motor is turning is adjusted in dependence on the ascertained temperature.

6. The method according to claim 3, wherein the temperature is calculated with the aid of the mathematical model in dependence on a rotational speed and/or a load of the drive motor.

7. The method according to claim 3, wherein the temperature is calculated with the aid of the mathematical model in dependence on a temperature of a coolant for cooling the drive motor.

8. The method according to claim 1, wherein the temperature is calculated in dependence on a fluid for operating a transmission of the drivetrain.

9. The method according to claim 1, wherein a grease is used as the damping medium.

10. A drivetrain for a motor vehicle, having at least one centrifugal pendulum, which comprises at least one primary part rotatable about an axis of rotation, at least one secondary part movable relative to the primary part, and at least one damping medium by which relative movements are to be hydraulically dampened between the primary part and the secondary part,
    an electronic calculating device, which is adapted to calculate at least one temperature of the damping medium with the aid of a mathematical model.

11. The method according to claim 2, wherein the drivetrain comprises at least one drive motor designed to drive the motor vehicle, by which at least the primary part is driven and thereby rotated about the axis of rotation.

12. The method according to claim 3, wherein the drive motor is used as the component.

13. The method according to one of claim 4, wherein the temperature is calculated with the aid of the mathematical model in dependence on a rotational speed and/or a load of the drive motor.

14. The method according to one of claim 5, wherein the temperature is calculated with the aid of the mathematical model in dependence on a rotational speed and/or a load of the drive motor.

15. The method according to one of claim 4, wherein the temperature is calculated with the aid of the mathematical model in dependence on a temperature of a coolant for cooling the drive motor.

16. The method according to one of claim 5, wherein the temperature is calculated with the aid of the mathematical model in dependence on a temperature of a coolant for cooling the drive motor.

17. The method according to one of claim 6, wherein the temperature is calculated with the aid of the mathematical model in dependence on a temperature of a coolant for cooling the drive motor.

* * * * *